US010807564B2

(12) United States Patent
Yamamoto et al.

(10) Patent No.: US 10,807,564 B2
(45) Date of Patent: Oct. 20, 2020

(54) SEAT HAPTIC SYSTEM AND METHOD OF DETERRING VEHICLE THEFT

(71) Applicant: Honda Motor Co., Ltd., Tokyo (JP)

(72) Inventors: Stuart Masakazu Yamamoto, La Mirada, CA (US); Joseph Anthony Alequin, Los Angeles, CA (US); Matias Monges, Los Angeles, CA (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 16/356,978

(22) Filed: Mar. 18, 2019

(65) Prior Publication Data

US 2020/0298798 A1 Sep. 24, 2020

(51) Int. Cl.
| | |
|---|---|
| *B60R 25/104* | (2013.01) |
| *B60R 25/01* | (2013.01) |
| *B60R 25/31* | (2013.01) |
| *B60N 2/90* | (2018.01) |
| *G08B 6/00* | (2006.01) |

(52) U.S. Cl.
CPC ........... *B60R 25/104* (2013.01); *B60N 2/90* (2018.02); *B60R 25/01* (2013.01); *B60R 25/31* (2013.01); *B60N 2002/981* (2018.02); *G08B 6/00* (2013.01)

(58) Field of Classification Search
None
See application file for complete search history.

(56) References Cited

U.S. PATENT DOCUMENTS

| | | | | |
|---|---|---|---|---|
| 4,651,157 A | * | 3/1987 | Gray | B60R 25/33 342/457 |
| 4,655,505 A | * | 4/1987 | Kashiwamura | A47C 7/467 297/284.6 |
| 5,396,216 A | * | 3/1995 | Morgan | B60R 25/04 307/10.3 |
| 5,912,615 A | * | 6/1999 | Kretzmar | B60R 25/04 180/287 |
| 6,382,694 B1 | | 5/2002 | Rankin et al. | |
| 6,630,891 B1 | * | 10/2003 | Dilling | G08G 1/0965 340/901 |
| 7,391,301 B2 | | 6/2008 | Seike et al. | |
| 7,551,065 B2 | * | 6/2009 | Higuchi | B60R 25/1004 340/426.1 |
| 8,686,940 B2 | * | 4/2014 | Nathan | G06F 3/016 345/156 |

(Continued)

FOREIGN PATENT DOCUMENTS

| | | |
|---|---|---|
| JP | S6130453 A | 2/1986 |
| JP | H0613282 Y2 | 2/1994 |
| WO | WO-9603296 A1 * 2/1996 | ........... B60R 25/066 |

*Primary Examiner* — Fekadeselassie Girma
(74) *Attorney, Agent, or Firm* — Armstrong Teasdale LLP

(57) ABSTRACT

A vehicle seat haptic system in a vehicle includes a vehicle seat, the vehicle seat including a plurality of actuators configured to generate a haptic output. The vehicle seat haptic system also includes a controller communicatively coupled to the plurality of actuators. The controller is configured to determine an unauthorized entry event has occurred at the vehicle, detect the vehicle is operating, and control said plurality of actuators, in response to determining the unauthorized entry event has occurred, to generate an anti-theft haptic output across the vehicle seat. The anti-theft haptic output has at least one of a magnitude, distribution, and frequency that causes physical discomfort to a user of the vehicle seat.

19 Claims, 6 Drawing Sheets

(56) References Cited

U.S. PATENT DOCUMENTS

| | | | | |
|---|---|---|---|---|
| 8,789,642 | B1 | 7/2014 | Rice et al. | |
| 8,942,892 | B2* | 1/2015 | Veen | B60N 2/0276 |
| | | | | 701/49 |
| 9,827,904 | B2* | 11/2017 | Modarres | B60Q 9/008 |
| 9,894,492 | B1* | 2/2018 | Elangovan | H04W 12/08 |
| 2006/0018641 | A1* | 1/2006 | Goto | B60R 25/1004 |
| | | | | 396/4 |
| 2006/0217864 | A1* | 9/2006 | Johnson | B60N 2/067 |
| | | | | 701/45 |
| 2007/0139170 | A1* | 6/2007 | Higuchi | B60R 25/104 |
| | | | | 340/426.1 |
| 2011/0025020 | A1* | 2/2011 | Alguera | B62D 53/08 |
| | | | | 280/504 |
| 2011/0151768 | A1* | 6/2011 | Snider | B60R 25/1025 |
| | | | | 455/1 |
| 2012/0226418 | A1* | 9/2012 | Veen | B60N 2/0276 |
| | | | | 701/49 |
| 2012/0249291 | A1* | 10/2012 | Holcomb | G07C 9/00563 |
| | | | | 340/5.51 |
| 2018/0188061 | A1* | 7/2018 | Yamamoto | G01C 21/3617 |
| 2018/0329111 | A1* | 11/2018 | Guglielmo | G05B 19/0428 |
| 2018/0374289 | A1* | 12/2018 | Huntzicker | B60R 25/042 |
| 2019/0279447 | A1* | 9/2019 | Ricci | B60R 25/25 |

\* cited by examiner

SEAT HAPTIC SYSTEM AND METHOD OF DETERRING VEHICLE THEFT

BACKGROUND

The field of the disclosure relates generally to haptic systems and, more particularly, to seat haptic systems in vehicle seats.

Haptic output systems are designed to communicate information to a person via the person's sense of touch. Haptic output systems are used in a wide variety of industries, including user computing device technology (e.g., haptic systems in smartphones) and in the automotive industry. For example, in the automotive industry, haptic technology is implemented in user interfaces, as well as in other vehicle components (e.g., vehicle seats and steering wheels) to impart information to, for example, a driver. For example, at least some known vehicle seat haptic systems provide warnings to users of potential collision risks and/or vehicles or bystanders proximate the vehicle. However, there is no known system that incorporates haptic output into an anti-theft system of a vehicle.

BRIEF DESCRIPTION

In one aspect, a vehicle seat haptic system includes a vehicle seat including a plurality of actuators configured to generate a haptic output, and a controller communicatively coupled to the plurality of actuators. The controller determines an unauthorized entry event has occurred at the vehicle, detects the vehicle is operating, and controls the plurality of actuators, in response to determining an unauthorized entry event has occurred, to generate an anti-theft haptic output across the vehicle seat. The anti-theft haptic output has at least one of a magnitude, distribution, and frequency that causes physical discomfort to a user of the vehicle seat.

In another aspect, a vehicle haptic system includes a plurality of actuators configured to generate a haptic output, and a controller communicatively coupled to the plurality of actuators. The controller determines an unauthorized entry event has occurred at a vehicle, detects the vehicle is operating, and controls the plurality of actuators, in response to determining an unauthorized entry event has occurred, to generate an anti-theft haptic output across a vehicle seat, the anti-theft haptic output having at least one of a magnitude, distribution, and frequency that causes physical discomfort to a user of the vehicle seat.

In yet another aspect, a method of generating an anti-theft haptic output by a plurality of actuators in a vehicle seat includes determining, by a controller communicatively coupled to the plurality of actuators, an unauthorized entry event has occurred at the vehicle, detecting, by the controller, the vehicle is operating, and controlling, by the controller, the plurality of actuators to generate an anti-theft haptic output across the seat, in response to determining an unauthorized entry event has occurred. The anti-theft haptic output has at least one of a magnitude, distribution, and frequency that causes physical discomfort to a user of the seat.

DETAILED DESCRIPTION

Figure 1:
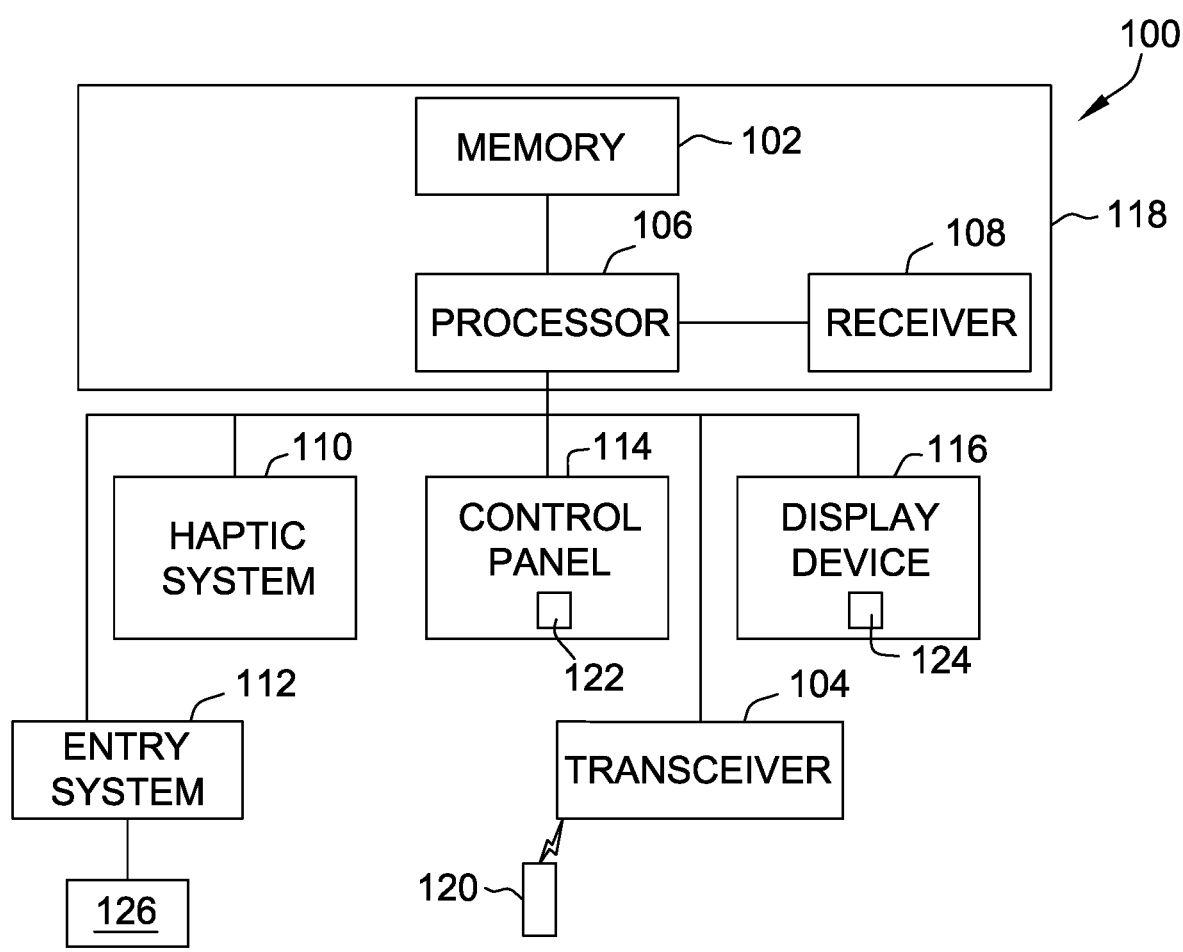
FIG. 1 is a block diagram of an exemplary vehicle control system.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., systems, devices, processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As described herein, a vehicle seat haptic system generates an uncomfortable haptic sensation in the seat when theft of the vehicle is detected to make operation of the vehicle difficult. Specifically, the vehicle seat haptic system generates a haptic output that causes physical discomfort or an uncomfortable feeling in the driver's seat of the vehicle to make driving the vehicle difficult, if theft of the vehicle is detected.

In alternative embodiments, the haptic output could be generated for different purposes and/or in response to different triggers. For example, in one alternative embodiment, the vehicle seat haptic system generates the uncomfortable haptic sensation in the seat when a driver of the vehicle (in this case, an authorized driver of the vehicle) is exhibiting behaviors associated with drowsiness while operating the vehicle. Such behaviors may include, for example, swerving, suddenly jerking the steering wheel or breaking, drifting between lanes, and the like. The vehicle may include sensors configured to sense such "drowsy behavior" and may generate the haptic output to keep the driver alert and awake. The vehicle seat haptic system may generate the haptic output in seats other than a driver's seat, to keep passengers awake.

Additionally or alternatively, the haptic output may be configured to encourage an occupant of a vehicle seat (e.g., a pet or passenger) to move, either within the seat (e.g., adjust their position) or to another seat. The vehicle seat haptic system may generate the haptic output in response to a user command (e.g., from a driver). As another example, the vehicle seat haptic system may generate the haptic output to "gamify" passenger seats. In some embodiments, the vehicle seat haptic system may generate the haptic output as a component of a warning system to indicate the urgency of an issue (e.g., driving issue, maintenance issue) to a driver or passenger of the vehicle.

Various embodiments of methods and systems for controlling functions of a vehicle control system, including a seat haptic system, are provided. It should be noted that although the various embodiments are described in connection with the automotive industry, such as for use with an automobile, one or more embodiments may be implemented in different industries and/or for different applications. Additionally, communication of information used in accordance with one or more embodiments may be performed with different types of communication protocols, as well as using different types of communication lines and communication buses.

FIG. 1 is a block diagram of an exemplary vehicle control system 100. In the exemplary embodiment, the vehicle control system 100 includes a memory 102, a transceiver 104, a processor 106, a receiver 108, a seat haptic system 110 (which may also be referred to as an "anti-theft haptic system" 110), a vehicle entry system 112, a control panel 114, and a display device 116. In some embodiments, the memory 102, the transceiver 104, the processor 106, and/or the receiver 108 may be included in a computing device, such as a controller 118 for the system 100, which may control or otherwise be communicatively coupled to any other component of the system 100 (e.g., the seat haptic system 110, the vehicle entry system 112, the control panel 114, and/or the display device 116).

The processor 106 may include one or more conventional electronic processors that interpret and execute instructions. The memory 102 may include a random access memory (RAM), a read-only memory (ROM), and/or another type of dynamic or static storage device that stores information and instructions for execution by the processor 106. The RAM, or another type of dynamic storage device, may store instructions as well as temporary variables or other intermediate information used during execution of instructions by the processor 106. The ROM, or another type of static storage device, may store static information and instructions for the processor 106.

The transceiver 104 may communicate with the processor 106 via a communication line, and may communicate wirelessly or via a wired connection with a portable device 120. The portable device 120 may include a mobile phone or other communication device, for example, belonging to an authorized user of the vehicle (e.g., an owner, lessee, driver, etc.). In some embodiments, the transceiver 104 may communicate wirelessly with the portable device 120 via a Bluetooth® protocol (Bluetooth is a registered trademark of Bluetooth Sig., Inc. of Bellevue, Wash.). In other embodiments, another wireless protocol may be used. In some embodiments, the transceiver 104 may be included as part of the controller 118. The transceiver 104 may communicate with other remote devices, such as a remote server device, as described further herein. Additionally or alternatively, the receiver 108 may include wireless and/or wired communication functionality to receive information from the portable device 120 (or another remote device) and/or from any component of the system 100 (e.g., the seat haptic system 110, the vehicle entry system 112, the control panel 114, and/or the display device 116).

The seat haptic system 110 may communicate with the processor 106 via a communication line to transmit data to/from the seat haptic system 110, such as for control of components of the seat haptic system 110 as described further herein. The seat haptic system 110 includes one or more vehicle seats of the vehicle and may be considered to include the controller 118, inasmuch as the controller 118 receives data from and/or transmits data (including control signals) to one or more components at the vehicle seats. In some embodiments, controller 118 or components thereof may be incorporated into one or more of the vehicle seats.

The vehicle entry system 112 manages authorized entry into the vehicle. The vehicle entry system 112 may include entry sensors that sense and facilitate authorized entry into the vehicle, such as one or more sensors, receivers, transmitters, and/or transceivers to receive and/or send signals from and/or to one or more authorized entry devices 126. Authorized entry devices 126 may include, for example, keys, key fobs, and/or mobile computing devices that authorized users (e.g., owners, drivers, passengers) of the vehicle may use to initiate authorized entry into the vehicle. The authorized entry devices 126 may be used, for example, to lock, unlock, start, stop, open, close, and/or otherwise interact with the vehicle. The vehicle entry system 112 may therefore include any suitable devices (e.g., receivers, transmitters, etc.) to enable the functionality of the authorized entry devices 126. The entry sensors may also include any suitable devices to detect or determine an unauthorized entry into the vehicle. The vehicle entry system 112 is in communication with the controller 118 to send and/or receive signals thereto/therefrom. For example, the vehicle entry system 112 transmits a signal to the controller 118 to indicate whether an entry into the vehicle is authorized or unauthorized.

The control panel 114 may communicate with the processor 106 via a communication line to transmit data to/from the control panel 114, such as for control of other modules or systems of the vehicle control system 100. The control panel includes a touchpad 122 for receiving an input from a user for control of the vehicle control system 100. The touchpad 122 may display virtual buttons that may be touched by the user of the vehicle to control the vehicle control system 100. Additionally or alternatively, the control panel 114 includes other input mechanisms, such as mechanical buttons or other controls (e.g., knobs, switches, etc.) associated with the touchpad 122 to receive inputs for controlling the vehicle control system 100. The control panel 114 may have a dedicated control module or unit that processes the control inputs and/or processes the data to be displayed on the display device 116 and/or the touchpad 122. Alternatively, such control functions may be processed by the processor 106 (e.g., as part of the controller 118).

The display device 116 may communicate with the processor 106 via a communication line to transmit data to/from the display device 116, such as for display of various information to the user of the vehicle. The display device 116 includes a display screen 124 for displaying information to the user. In one embodiment, the display device 116 is separate from the control panel 114, such as located at a different location in the vehicle. For example, the display screen 124 can be positioned for convenient viewing by the user, and the touchpad 122 can be positioned within a comfortable distance from a hand of the user. The display screen 124 may display different icons, graphics, and the like than the touchpad 122. The virtual buttons on the touchpad 122 may correspond to and/or be mapped to the display icons on the display screen 124. In another embodiment, the display device 116 is the same as or coupled to the control panel 114. For example, the touchpad 122 is combined with the display screen 124, such as via a touchscreen that functions as both an output device and an input device.

Figure 2:
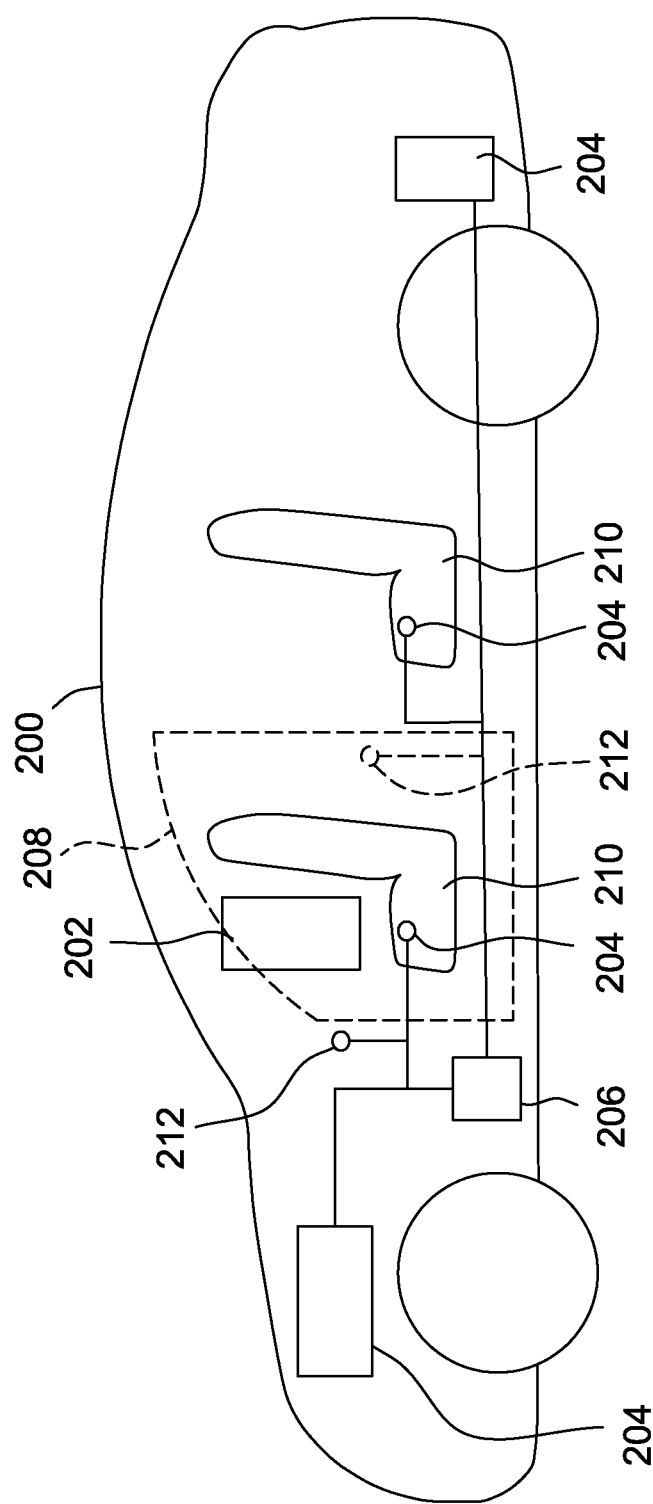
FIG. 2 is a schematic view of an exemplary vehicle including an exemplary seat haptic system.

FIG. 2 is a schematic view of an exemplary vehicle 200 in which the vehicle control system 100 (shown in FIG. 1) may be implemented. While the vehicle 200 may be an automobile in the exemplary embodiment, in other embodiments, the vehicle 200 may be, but is not limited to, other types of ground craft, aircraft, and watercraft vehicles. The vehicle 200, which may be operated by a driver 202, includes a plurality of sensors 204 and a vehicle controller 206 (which may be the same as the controller 118, shown in FIG. 1). The plurality of sensors 204 may detect the presence of the driver 202 in the vehicle 200. In these embodiments, the plurality of sensors 204 may detect the presence of fastened seatbelts, the weight in each seat in vehicle 200, heat signatures, or any other method of detecting information about the driver 202 in the vehicle 200. Additionally, the vehicle 200 may refer to an autonomous vehicle and/or self-driving vehicle powered by any form of energy. In such cases, reference herein to a "driver" may apply to any occupant of the vehicle 200 in a driver's seat and/or in any other vehicle seat within the vehicle 200. The plurality of sensors 204 may also include sensors that detect conditions of and/or operations performed by the vehicle 200, such as starting up or engine ignition, velocity, acceleration, braking, and other conditions related to the operation of the vehicle 200.

In the exemplary embodiment, the plurality of sensors 204 include entry sensors 212, such as sensors 212 located in at least one vehicle door 208 and/or in other locations of the vehicle 200. The entry sensors 212 detect an entry event and, in at least some embodiments, determine whether the entry event is authorized or unauthorized.

An authorized entry event is an entry event initiated using an authorized entry device 126 (shown in FIG. 1), such as a key or key fob associated with the vehicle 200. An authorized entry event may also take place at some point in time after an authorized entry device 126 is used to unlock or open the vehicle 200. For example, a vehicle 200 parked in a garage may not always be locked but entry thereby by an owner of the vehicle 200 is still authorized even when an authorized entry device 126 (e.g., a key) is not actively used. Accordingly, an authorized entry event may also be characterized as being associated with an authorized user of the vehicle 200, such as an owner or a driver or passenger authorized by the owner to use the vehicle 200. In contrast, an unauthorized entry event is an entry event initiated without an authorized entry device 126 by a user not authorized to enter or use the vehicle 200, such as a break-in, "hot-wiring" of the vehicle, or another theft event.

In the exemplary embodiment, the vehicle 200 includes a plurality of seats 210, wherein each vehicle seat 210 corresponds to a seating location that may be occupied by a user of the vehicle 200 (i.e., the driver 202 or one or more passengers, not shown). As described further herein, in the exemplary embodiment, the seat haptic system 110 (shown in FIG. 1) includes a plurality of actuators (not shown in FIG. 2) positioned in each vehicle seat 210. Each of the actuators is independently controllable by the controller 206 to generate a haptic output in each seat 210, specifically in the driver's seat, in response to various control conditions. At least some vehicle sensors 204 are employed to detect various characteristics of the vehicle 200 and/or one or more users thereof. For example, the entry sensors 212 detect that an entry event has occurred at the vehicle 200. The entry sensors 212 may include sensor devices communicatively coupled to a lock mechanism and/or a handle mechanism of one or more vehicle doors 208, such that the entry sensors 212 detect an entry event when the lock mechanism and/or handle mechanism is used or activated. The entry sensors 212 may additionally or alternatively include presence sensors, such as motion detectors, pressure sensors, audio sensors, and/or any other suitable device that detects the presence of a person in the vehicle 200, and/or that detects one or more vehicle doors 208 having been opened.

The entry sensors 212 may additionally determine whether an entry into the vehicle 200 is authorized or unauthorized. For example, the entry sensors 212 may detect whether an entry event is authorized or unauthorized based upon whether an authorized entry device 126 was utilized to activate the lock and/or handle mechanism (e.g., whether a key was inserted and turned or whether a key fob was pressed). The entry sensors 212 may additionally include sensors that detect and/or identify an authorized entry device 126, such as a proximity or near-field-communication sensor that detects and/or identifies a key fob and/or mobile computing device. In such embodiments, the entry sensors 212 also identify whether the entry event is authorized or unauthorized based upon the detection and/or identification (or lack thereof) of an authorized entry device 126.

When an entry event is detected, the entry sensors 212 transmit a signal to the controller 206 indicating an entry event has occurred. In some embodiments, the entry sensors 212 determine or detect whether the entry event is authorized or unauthorized. For example, the entry sensors 212 may detect that a vehicle lock mechanism (not shown) is improperly disengaged (e.g., has been disengaged without use of an authorized entry device 126). As another example, the entry sensors 212 may detect an absence of an authorized entry device 126, such as an authorized vehicle key. In such embodiments, the signal to the controller 206 may include an indicator of whether the entry event is authorized or unauthorized.

The controller 206 receives the signal from the entry sensors 212. In certain embodiments in which the signal does not indicate whether the entry event is authorized or unauthorized, the controller 118 retrieves and/or receives additional data (e.g., from sensor data from other sensors 204 or data signals from other components of the vehicle 200 or vehicle entry system 112) to determine whether the entry event is authorized. For example, the controller 206 may receive a signal from an authorized entry device 126 (e.g., a mobile computing device) indicating that the entry is unauthorized. The controller 206 also receives sensor data from other sensors 204 or signals from other components of the vehicle 200 to determine that the vehicle 200 is operating following an unauthorized entry event. A theft event is characterized by operation of the vehicle 200 following an unauthorized entry event. Therefore, the controller 206 determines, based on the received sensor data from various sensors 204, 212 that a theft event is occurring at the vehicle 200. The controller 118 may determine the vehicle 200 is operating based on a signal from, for example, an engine component or battery component of the vehicle 200.

The controller 206 then transmits a control signal to one or more actuators at the vehicle seats 210, specifically at the driver's seat 210. Receiving the control signal causes the corresponding actuator(s) to generate a haptic output as instructed by the control signal. In particular, the control signal causes the actuators to generate an anti-theft haptic output across the driver's seat 210 that makes operation of the vehicle difficult and/or uncomfortable, to impede or discourage further use of the vehicle 200 by the (unauthorized) driver 202 thereof. Specifically, the anti-theft haptic output has a magnitude, distribution, and/or frequency that causes physical discomfort to the user or inhibits comfortable use of the vehicle seat 210.

Figure 3:
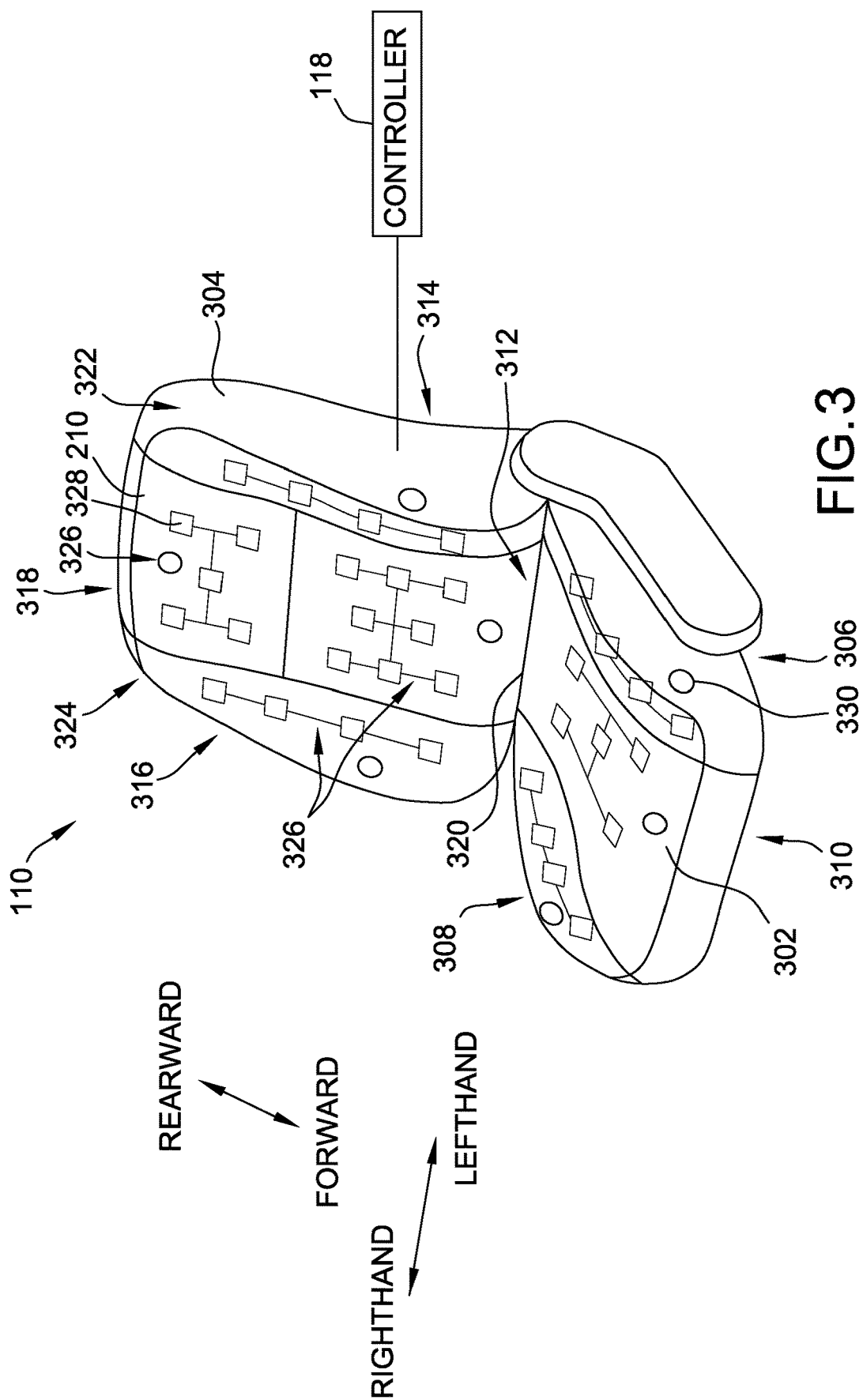
FIG. 3 is a perspective view of an exemplary seat haptic system suitable for use in the vehicle shown in FIG. 2, wherein the seat haptic system includes a vehicle seat.

FIG. 3 is a perspective view of the seat haptic system 110 shown in FIG. 1. The seat haptic system 110 is suitable for use, for example, in the vehicle 200 (shown in FIG. 2). The seat haptic system 110 includes one or more vehicle seats 210—specifically, at least a driver's seat 210 of a driver 202

(shown in FIG. 2)—and the controller 118 (shown in FIG. 1, which may be the same as or substantially equivalent to the controller 206 shown in FIG. 2). The controller 118 is located at any suitable location in the vehicle 200, and is communicatively coupled to components of the driver's seat 210 (e.g., actuators) to transmit control signals thereto.

The driver's seat 210 includes a base 302 and a back 304. In some embodiments, the vehicle seat 210 also includes a head rest (not shown in FIG. 3). The base 302 extends laterally (i.e., from left to right) from a first side 306 to a second side 308, and longitudinally (i.e., from front to back) from a front 310 to a rear 312. Similarly, the back 304 extends laterally from a first side 314 to a second side 316, and vertically from a top 318 to a bottom 320, where the bottom 320 of the back 304 is adjacent to the rear 312 of the base 302. The base first side 306 and back first side 314 collectively define a first side 322 of the seat 210. Similarly, the base second side 308 and back second side 316 collectively define a second side 324 of the seat 210.

A plurality of haptic zones 326 are defined across the seat base 302 and the seat back 304. Each haptic zone 326 includes one or more actuators 328 therein. Each actuator 328 includes an electrical, mechanical, and/or electro-mechanical actuator 328 suitable to generate a haptic output that is discernible by an occupant of the seat 210. The haptic output may include a vibration, a discrete or individual force output, a motion, a combination thereof, and/or any other suitable haptic output. Suitable actuators 328 include, but are not limited to eccentric rotating mass (ERM) actuators, linear resonant actuators, piezoelectric actuators, and/or any combination thereof.

In the illustrated embodiment, the seat back 304 includes four haptic zones 326, and the seat base 302 includes three haptic zones 326. It should be readily understood that, in other embodiments, there may be additional haptic zones 326, fewer haptic zones 326, and/or haptic zones 326 having different dimensions, shapes, orientations, configurations, and/or positions than those shown in FIG. 3 without departing from the scope of the present disclosure. For instance, it is contemplated that a seat 210 may include haptic zones 326 with respective actuators in armrests, a headrest, a calf area, and/or a foot rest or floor area surrounding the vehicle seat 210 (not shown in FIG. 3).

Each actuator 328 is communicatively coupled to the controller 118 and is independently controllable thereby to generate a haptic output in response to a control signal from the controller 118. Accordingly, certain actuators 328 may be controlled to generate a haptic output, also referred to as "activating" an actuator 328, while one or more other actuators 328 remain "deactivated" or "idle," and do not generate a haptic output.

In the exemplary embodiment, the controller 118 generates the control signal to cause the actuators 328 to generate an anti-theft haptic output. Specifically, in response to determining that a theft event, the controller 118 generates the control signal to cause the actuators 328 to generate an anti-theft haptic output having a magnitude, distribution, and/or frequency that causes physical discomfort for a user of the seat 210, to impede or discourage the unauthorized use of the vehicle 200. As used herein, the "magnitude" of haptic output refers generally to a level or amplitude of the haptic output, from low to high. That is, a low-magnitude haptic output is a lower-level output that is felt less by a user, whereas a high-magnitude haptic output is a higher-level output that is felt more by a user. A "distribution" of haptic output refers generally to a pattern or sequence of activation of a plurality of actuators 328 within a haptic zone 326, and a "frequency" of haptic output refers generally to how often a particular actuator 328 is activated. For example, the haptic output may have a side-to-side output distribution in which the actuators 328 are activated sequentially from one side of the vehicle seat 210 to the other. Other examples may include a top-to-bottom distribution, a front-to-rear distribution, a random distribution, and/or combinations of any of the above distributions. In some embodiments, a distribution may incorporate magnitude variation as well as active/idle variation. That is, a particular distribution may incorporate low-level magnitude in one area of the vehicle seat 210 with higher-level magnitude in another area of the vehicle seat 210. Any such distribution may also incorporate varying, regular, and/or irregular haptic output frequencies of individual actuators 328.

Additionally or alternatively, the haptic output may be asynchronous and/or otherwise variable. As used herein, "asynchronous" haptic output refers to active (i.e., non-zero) haptic output that is out of sync from one haptic zone 326 to another or within a haptic zone 326. "Variable" haptic output refers to haptic output that has variable magnitude from one haptic zone 326 to another or within a haptic zone 326. A haptic output may therefore be asynchronous and invariable (i.e., out of sync, but at the same magnitude), synchronous and variable (i.e., in sync, but at varying magnitudes), and/or asynchronous and variable (out of sync, and at varying magnitudes) across the vehicle seat 210. The magnitude may vary or lack synchronization side-to-side (e.g., left-to-right or right-to-left), up-and-down, or randomly across the vehicle seat 210.

The haptic output may be effected across the seat 210 with each haptic zone 326 controlled individually (i.e., "zone-level" haptic output control) and/or across a haptic zone 326 with each actuator 328 therein controlled individually (i.e., "actuator-level" haptic output control). In other words, the magnitude, distribution, and/or frequency of haptic output within a haptic zone 326 may vary.

The anti-theft haptic output generated by the actuators 328 (i.e., in response to the control signal generated by the controller 118) is selected to cause physical discomfort to a user and therefore may include a magnitude, distribution, and/or frequency selected to maximize discomfort. It is contemplated that various combinations of magnitude, distribution, and frequency may induce an uncomfortable experience for the unauthorized user of the vehicle 200. That is, particularly high-magnitude haptic output and/or random, unpredictable, and/or asynchronous distributions with varying frequencies may lead to increased discomfort. Generating high-magnitude haptic output in certain regions of the vehicle seat 210, such as in a lower-back region of the vehicle seat 210 or a headrest region of the vehicle seat 210, may increase discomfort for the unauthorized user.

In some embodiments, the vehicle seat 210 includes one or more pressure sensors 330 in the seat base 302 and/or the seat back 304. The pressure sensors 330 sense a position of a user in the vehicle seat 210 based on the amount of pressure exerted at each pressure sensor 330. For example, a greater response from the pressure sensor 330 is indicative of higher pressure at the pressure sensor 330, which in turn indicates that the user of the vehicle seat 210 is leaning in that direction (or is otherwise exerting more pressure in that region). In some embodiments, the controller 118 receives sensor data from the pressure sensors 330 indicating a position of the (unauthorized) user in the seat 210 and, in response, adjusts the haptic output generated by the actuators 328. Specifically, in response to determining the user is leaning in a particular direction or onto a particular part of the seat 210, the controller 118 causes the actuators 328 to increase the magnitude and/or vary the distribution and/or frequency of the haptic output in that direction or at that part of the seat 210. Accordingly, if a user attempts to avoid the anti-theft haptic output by adjusting their position in the seat 210, the controller 118 responds to increase the discomfort of the user in the adjusted position, to continuously deter further unauthorized use of the vehicle 200.

In some embodiments, the controller 118 additionally or alternatively generates the haptic output by controlling an amount of current supplied to the actuators 328 such that the amount of current supplied to the actuators 328 exceeds a maximum current limit associated with comfortable use of the actuators 328. The maximum current limit may be input by a user, the controller 118 may define the maximum current limit, or the controller 118 may be preprogrammed with the maximum current limit (e.g., the maximum current limit may be saved in the memory 102).

Figure 4:
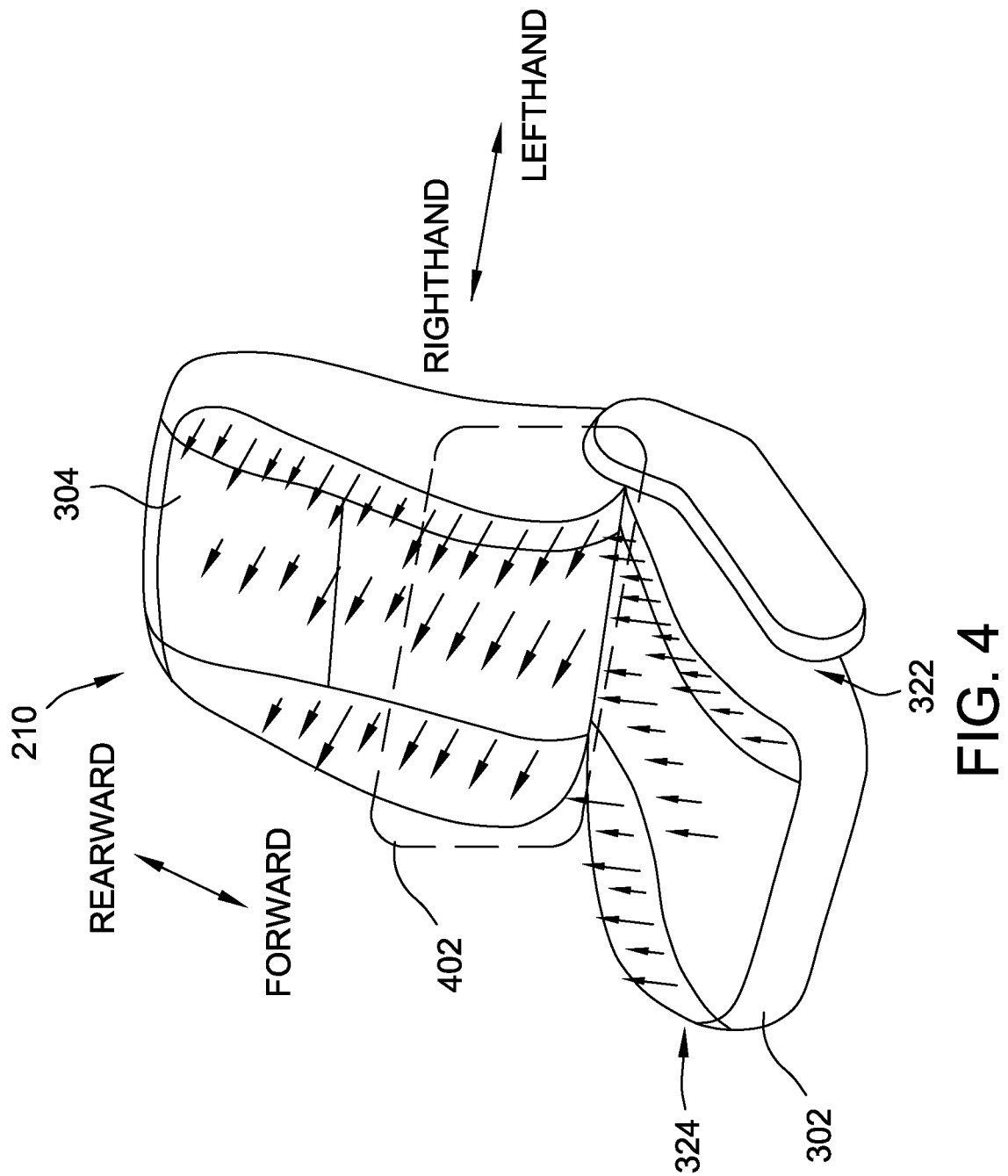
FIGS. 4 and 5 are perspective views of the vehicle seat shown in FIG. 3, illustrating an exemplary anti-theft haptic output at the vehicle seat.
Figure 5:
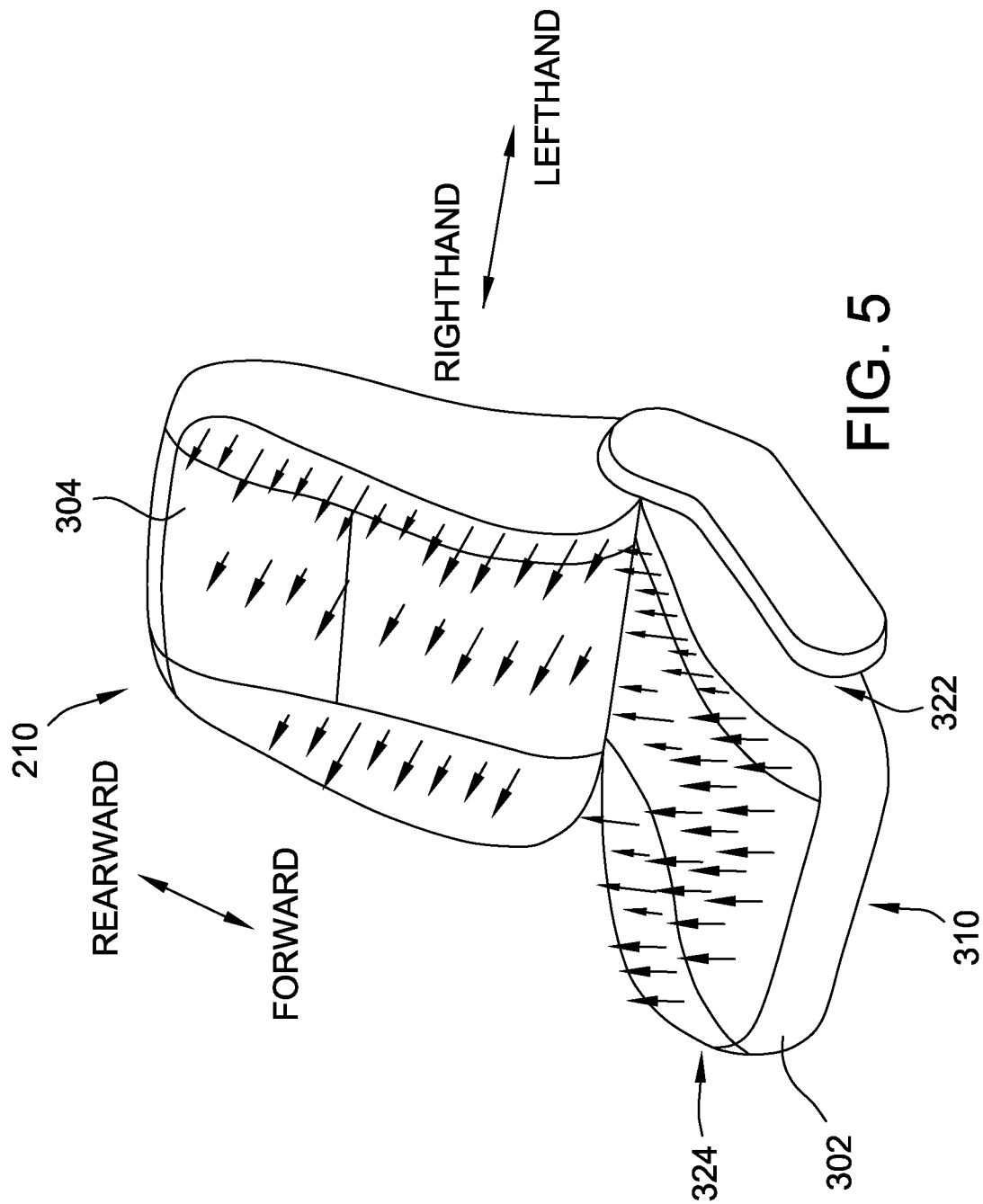

FIGS. 4 and 5 illustrate a haptic output state in which a theft event is occurring. That is, the controller 118 has determined that (a) an unauthorized entry event has occurred and (b) the vehicle 200 is operating or otherwise is actively in use. The controller 118 (shown in FIG. 1) generates a control signal that is transmitted to the actuators 328 (shown in FIG. 3) in the vehicle seat 210 (i.e., the driver's seat 210) to generate an uncomfortable or "anti-theft" haptic output, as described above. In the illustrated embodiment of FIG. 4, to generate the anti-theft haptic output, the controller 118 causes the actuators 328 to generate a high-level haptic output in a lower-back region 402, defined adjacent the bottom 320 of the seat back 304, which may be uncomfortable to the unauthorized driver (not shown) sitting in the driver's seat 210. That is, the high-level haptic output may discourage or prevent comfortable contact with the lower-back region of the seat back 304; accordingly, the unauthorized driver may have to adjust their position to avoid the uncomfortable anti-theft haptic output, which may make operating the vehicle 200 difficult. In the illustrated embodiment, the actuators 328 are generating a randomized haptic output across the rest of the driver's seat 210, which may further increase the discomfort of the unauthorized driver sitting in the driver's seat 210. The randomized haptic output may include randomized magnitude and/or frequency of haptic output. For example, one actuator 328 may generate a high-level haptic output with a quick but irregular pulse frequency, while another actuator may generate a haptic output with a varying magnitude with a regular or steady frequency. Moreover, in some embodiments, the actuators 328 generate a higher-level (randomized or otherwise) haptic output across the seat back 304 than the seat base 302 to make it uncomfortable for the unauthorized driver to sit back in the driver's seat 210.

It is contemplated that the controller 118 may receive signals from the pressure sensors 330 and, based on the received signals, determine a position of the unauthorized driver in the vehicle seat 210 including a region of the driver's seat 210 at which the unauthorized driver is leaning or exerting higher pressure. For example, in response to the high-level haptic output at the lower-back region 402, the unauthorized driver may shift forward in the driver's seat 210. The pressure sensors 330 send signals to the controller 118 indicating the higher level of pressure exerted in the front 310 of the vehicle seat 210. Accordingly, as shown in FIG. 5, the controller 118 may cause the actuators 328 in the front 310 of the seat base 302 to generate a higher-level haptic output. That is, the controller 118 adjusts the haptic output based on the position of the unauthorized driver to continuously deliver higher magnitude haptic output where the unauthorized driver is leaning or exerting higher pressure.

Figure 6:
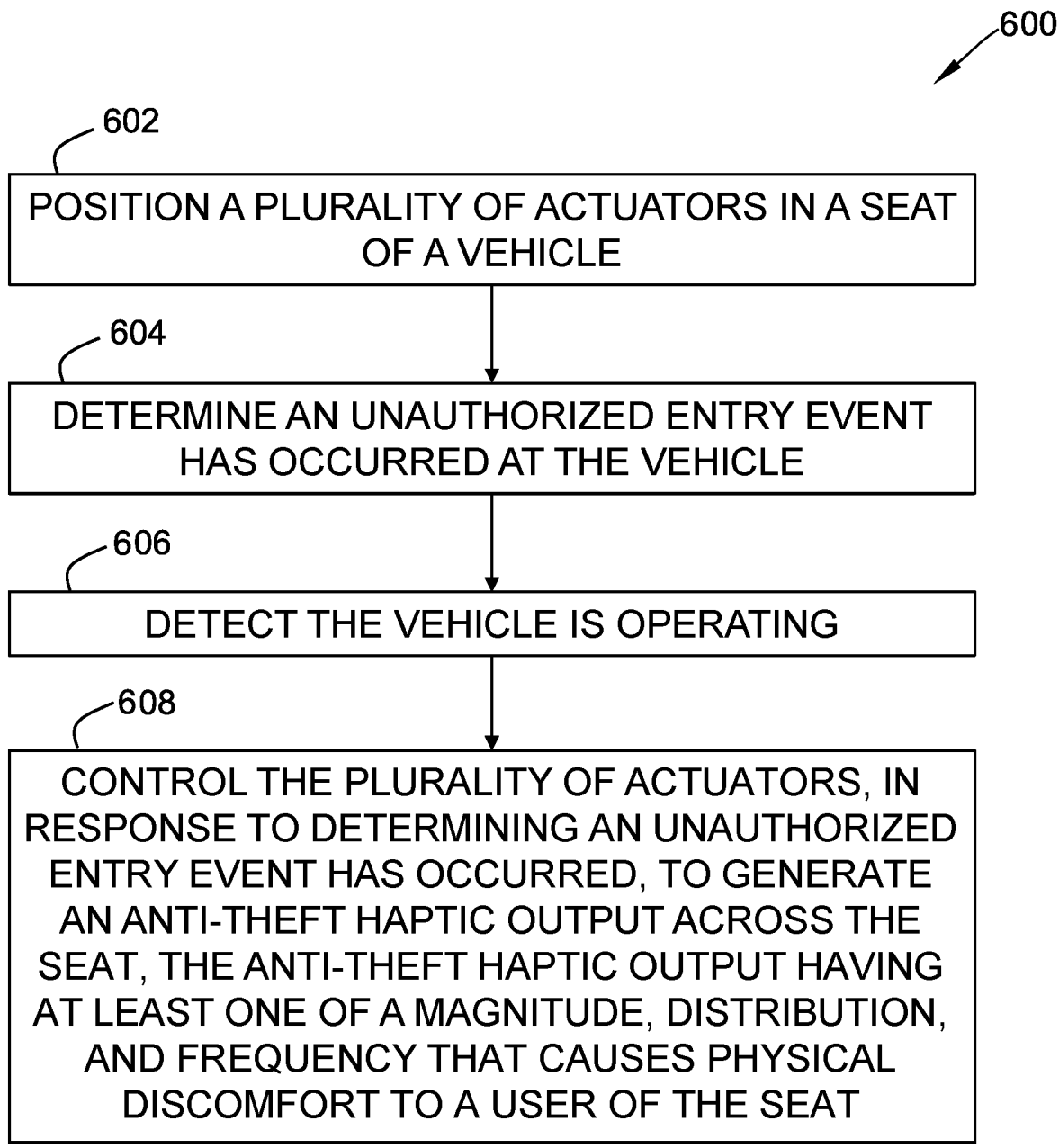
FIG. 6 is a flow chart of an exemplary method of generating a haptic output at the vehicle seat shown in FIGS. 3-5.

FIG. 6 is a flow chart of an exemplary method 600 for generating an anti-theft haptic output in a vehicle seat. In the exemplary embodiment, aspects of the method 600 are performed by the controller 118 (shown in FIG. 1).

In the exemplary embodiment, the method 600 includes positioning 602 a plurality of actuators (e.g., the actuators 328, shown in FIG. 3) in a seat (e.g., a vehicle seat such as the vehicle seat 210, shown in FIGS. 2-5) of a vehicle (e.g., the vehicle 200, shown in FIG. 2).

The method 600 also includes determining 604 an unauthorized entry event has occurred at the vehicle, and detecting 606 the vehicle is operating. In some embodiments, determining 604 includes detecting at least one vehicle lock is improperly disengaged, detecting an absence of an authorized vehicle key during the unauthorized entry event or operation of the vehicle, and/or receiving a signal from an authorized entry device (e.g., the authorized entry device 126, shown in FIG. 1).

The method 600 also includes controlling 608, in response to determining an unauthorized entry event has occurred, the plurality of actuators to generate an anti-theft haptic output across the seat, the anti-theft haptic output having at least one of a magnitude, distribution, and frequency that causes physical discomfort to a user of the seat. In some embodiments, controlling 608 includes controlling the plurality of actuators with at least one of a high magnitude of the anti-theft haptic output, a randomized distribution of the anti-theft haptic output, and a randomized frequency of the anti-theft haptic output.

It should be readily understood that the method 600 may include additional, fewer, and/or alternative steps. For example, in some embodiments, method 600 further includes receiving signals from a plurality of pressure sensors (e.g., the pressure sensors 330, shown in FIG. 3) communicatively coupled to the controller, determining a position of an unauthorized user in the seat including a region at which the unauthorized user is exerting a higher pressure, and controlling, by the controller, the plurality of actuators to generate the anti-theft haptic output having an increased magnitude in the region.

Embodiments of the seat haptic systems described herein facilitate leveraging haptic output systems in a vehicle to discourage theft of the vehicle. Specifically, the seat haptic system facilitates generating an anti-theft haptic output with a selected magnitude, frequency, and/or distribution that makes unauthorized use of the vehicle uncomfortable to deter theft and/or continued unauthorized use of the vehicle.

The methods and system described herein may be implemented using computer programming or engineering techniques including computer software, firmware, hardware, or any combination or subset. Some technical problems with known systems include (a) a need to actively discourage theft during an unauthorized entry and/or theft event occurring at a vehicle; (b) a need to introduce new systems or leverage existing systems to induce discomfort for an unauthorized user of a vehicle; and (c) a need to facilitate communication information directly and efficiently to the unauthorized user of the vehicle, specifically discouraging the unauthorized user to continue their unauthorized use and/or theft of the vehicle. Embodiments of the systems and methods described herein address such technical problems. The technical effect of at least some embodiments of the systems and processes described herein is achieved by performing at least one of the following steps: (a) positioning a plurality of actuators in a seat of a vehicle; (b) determining an unauthorized entry event has occurred at the vehicle; (c) detecting the vehicle is operating; and (d) controlling the plurality of actuators to generate an anti-theft haptic output across the seat, the anti-theft haptic output having at least one of a magnitude, distribution, and frequency that causes physical discomfort to a user of the seat. The resulting technical effect is that the haptic output discourages continued authorized use of the vehicle.

One or more embodiments include a system, which may be implemented as a programmable logic controller (PLC), also referred to as a programmable logic circuit or simply "controller," that controls various functions and operations of the vehicle, such as a seat haptic system, a vehicle entertainment system, and the like. The controller may control display functions on one or more display devices or screens. The controller may monitor, receive, detect, interpret, and/or transmit one or more inputs or outputs between a display device and a control panel. Moreover, the controller may receive, detect, monitor, and/or transmit signals from other components of the vehicle control system, including sensors and actuators.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A vehicle seat haptic system comprising:
    a vehicle seat comprising:
       a plurality of actuators configured to generate a haptic output; and
       a plurality of pressure sensors; and
    a controller communicatively coupled to said plurality of actuators, wherein said controller is configured to:
       determine an unauthorized entry event has occurred at the vehicle;
       detect the vehicle is operating;
       receive signals from said plurality of pressure sensors;
       determine, based on the received signals, a position of an unauthorized user in the vehicle seat including a high-pressure region at which the unauthorized user exerts a relatively high pressure;
       select a magnitude, distribution, and frequency of an anti-theft haptic output to cause physical discomfort to a user of said vehicle seat, including an increased magnitude in the high-pressure region; and
       control said plurality of actuators, in response to determining an unauthorized entry event has occurred, to generate the anti-theft haptic output across said vehicle seat to cause physical discomfort to the user of said vehicle seat.

2. The vehicle seat haptic system of claim 1, wherein the selected frequency includes a randomized frequency.

3. The vehicle seat haptic system of claim 1, wherein said controller is configured to determine the unauthorized entry event has occurred by detecting at least one vehicle lock is improperly disengaged.

4. The vehicle seat haptic system of claim 1, wherein said controller is configured to determine the unauthorized entry event has occurred by detecting an absence of an authorized vehicle key during at least one of the unauthorized entry event and operation of the vehicle.

5. The vehicle seat haptic system of claim 1, wherein said controller is configured to determine the unauthorized entry event has occurred by receiving a signal from an authorized entry device, wherein receiving the signal causes said controller to control said plurality of actuators to generate the anti-theft haptic output.

6. The vehicle seat haptic system of claim 1, wherein said vehicle seat is a driver's seat of the vehicle.

7. The vehicle seat haptic system of claim 1, wherein said vehicle seat comprises a seat base and a seat back, and wherein said plurality of actuators are positioned within said seat base and said seat back.

8. A vehicle haptic system comprising:
    a plurality of actuators configured to generate a haptic output; and
    a controller communicatively coupled to said plurality of actuators, wherein said controller is configured to:
       determine an unauthorized entry event has occurred at a vehicle;
       detect the vehicle is operating;
       select a first magnitude and a first frequency of an anti-theft haptic output to be generated in a first region of a vehicle seat;
       select a second magnitude and a second frequency of the anti-theft haptic output to be generated in a second region of the vehicle seat, wherein at least one of the second magnitude or the second frequency is different from a corresponding one of the first magnitude and the first frequency to cause physical discomfort to a user of a vehicle seat; and
       control said plurality of actuators, in response to determining an unauthorized entry event has occurred, to generate the anti-theft haptic output in the first and second regions of the vehicle seat to cause physical discomfort to the user of the vehicle seat.

9. The vehicle haptic system of claim 8, wherein said controller is configured to determine the unauthorized entry event has occurred by detecting at least one vehicle lock is improperly disengaged.

10. The vehicle haptic system of claim 8, wherein said controller is configured to determine the unauthorized entry event has occurred by detecting an absence of an authorized vehicle key during at least one of the unauthorized entry event and operation of the vehicle.

11. The vehicle haptic system of claim 8, wherein said controller is configured to determine the unauthorized entry event has occurred by receiving a signal from an authorized entry device, wherein receiving the signal causes said controller to control said plurality of actuators to generate the anti-theft haptic output.

12. The vehicle haptic system of claim 8, further comprising a plurality of pressure sensors, wherein said controller is further configured to:
    receive signals from said plurality of pressure sensors;
    determine, based on the received signals, a position of an unauthorized user in the vehicle seat including a high-pressure region at which the unauthorized user exerts a relatively high pressure; and
    control said plurality of actuators to generate the anti-theft haptic output having an increased magnitude in the high-pressure region.

13. The vehicle haptic system of claim 8, wherein the vehicle seat comprises a seat base and a seat back, wherein said plurality of actuators are positioned within the seat base and the seat back.

14. The vehicle haptic system of claim 13, wherein the first region is one of the seat base and the seat back and the second region is the other of the seat base and the seat back.

15. The vehicle haptic system of claim 8, wherein at least one of: (i) the first frequency or the second frequency is a randomized frequency, or (ii) the first magnitude or the second magnitude is a high magnitude.

16. A method of generating an anti-theft haptic output by a plurality of actuators in a vehicle seat, said method comprising:
    determining, by a controller communicatively coupled to the plurality of actuators, an unauthorized entry event has occurred at the vehicle;
    detecting, by the controller, the vehicle is operating;
    selecting, by the controller, a first magnitude and a first frequency of an anti-theft haptic output to be generated in a first region of a vehicle seat;
    selecting a second magnitude and a second frequency of the anti-theft haptic output to be generated in a second region of the vehicle seat, wherein at least one of the second magnitude or the second frequency is different from a corresponding one of the first magnitude and the first frequency to cause physical discomfort to a user of the vehicle seat; and
    controlling, by the controller, the plurality of actuators to generate the anti-theft haptic output in the first and second regions of the vehicle seat, in response to determining an unauthorized entry event has occurred, to cause physical discomfort to the user of the vehicle seat.

17. The method of claim 16, wherein determining the unauthorized entry event has occurred comprises at least one of:
    detecting, by the controller, at least one vehicle lock is improperly disengaged;
    detecting, by the controller, an absence of an authorized vehicle key during at least one of the unauthorized entry event and operation of the vehicle; and
    receiving, by the controller, a signal from an authorized entry device.

18. The method of claim 16, further comprising:
    receiving, by the controller, signals from a plurality of pressure sensors communicatively coupled to the controller;
    determining, by the controller, based on the received signals, a position of an unauthorized user in the seat including a high-pressure region at which the unauthorized user exerts a relatively high pressure; and
    controlling, by the controller, the plurality of actuators to generate the anti-theft haptic output having an increased magnitude in the high-pressure region.

19. The method of claim 16, wherein selecting a first magnitude and a first frequency of an anti-theft haptic output to be generated in a first region of a vehicle seat comprises selecting at least one of:
    a high magnitude of the anti-theft haptic output to be generated in the first region; and
    a randomized frequency of the anti-theft haptic output to be generated in the first region.

* * * * *